(12) United States Patent  
Moon

(10) Patent No.: US 7,673,910 B2  
(45) Date of Patent: Mar. 9, 2010

(54) EXTENDABLE FLUID TRANSPORT APPARATUS

(76) Inventor: James Moon, 5420 Fern Loop, W. Richland, WA (US) 99353

( * ) Notice: Subject to any disclaimer, the term of this patent is extended or adjusted under 35 U.S.C. 154(b) by 521 days.

(21) Appl. No.: 11/760,781

(22) Filed: Jun. 10, 2007

(65) Prior Publication Data

US 2008/0304922 A1 Dec. 11, 2008

(51) Int. Cl.
*F16L 27/12* (2006.01)
(52) U.S. Cl. ............... 285/302; 285/121.1; 285/145.1; 239/532
(58) Field of Classification Search ............ 285/7, 285/32, 106, 121.1–121.7, 123.1–123.17, 285/124, 145.1, 145.4, 298, 302, 303; 239/124, 239/126, 165, 171, 172, 280, 280.5, 281, 239/530, 532; 403/359.1, 359.6, 383
See application file for complete search history.

(56) References Cited

U.S. PATENT DOCUMENTS

| | | | | |
|---|---|---|---|---|
| 2,064,278 A * | 12/1936 | Tappe | ........................... | 169/25 |
| 4,652,024 A | 3/1987 | Krohn | | |
| 4,805,653 A * | 2/1989 | Krajicek et al. | ......... | 134/166 C |
| 5,186,392 A | 2/1993 | Pleshek | | |
| 5,485,960 A | 1/1996 | Troudt | | |
| 5,502,864 A | 4/1996 | Sorenson | | |
| 5,598,598 A | 2/1997 | Sorenson | | |
| 5,799,835 A * | 9/1998 | Gobbel | ........................ | 222/174 |
| 5,881,601 A | 3/1999 | Hammer | | |
| 5,890,654 A * | 4/1999 | Dupre | ........................ | 239/14.2 |
| 5,921,441 A * | 7/1999 | Small et al. | ................... | 222/148 |
| 6,045,284 A * | 4/2000 | Chiu | .......................... | 401/289 |
| 6,378,922 B1 | 4/2002 | Troudt | | |
| 6,811,100 B2 | 11/2004 | Bardinet et al. | | |
| 6,848,721 B2 * | 2/2005 | Brans | ........................ | 285/302 |
| 6,889,920 B2 | 5/2005 | Nance et al. | | |
| 6,905,080 B2 * | 6/2005 | Pohorecki | .................... | 239/280 |
| 6,976,644 B2 | 12/2005 | Troudt | | |
| 7,624,933 B2 * | 12/2009 | Boekelman | .................. | 239/124 |
| 2003/0062424 A1 * | 4/2003 | McKinney et al. | ......... | 239/14.2 |
| 2005/0029366 A1 | 2/2005 | Troudt | | |
| 2005/0045751 A1 | 3/2005 | Nance | | |

\* cited by examiner

*Primary Examiner*—James M Hewitt
*Assistant Examiner*—Jay R Ripley
(74) *Attorney, Agent, or Firm*—Floyd E. Ivey

(57) ABSTRACT

An extendable fluid transport apparatus for conveyance of a fluid to a remote surface. A rigid fluid tube (300) receives fluid and is in fluid communication and interconnection with a flexible flex tube (400) which is in fluid communication and interconnection with a connection means proximal a telescoping tube (200) second end for conveyance of a fluid, including paint, to a distant surface. The telescoping tube (200) is slidably received into a casing (100). The flex tube is received through a casing slot (120) and a telescoping tube slot (240) into the telescoping tube.

8 Claims, 9 Drawing Sheets

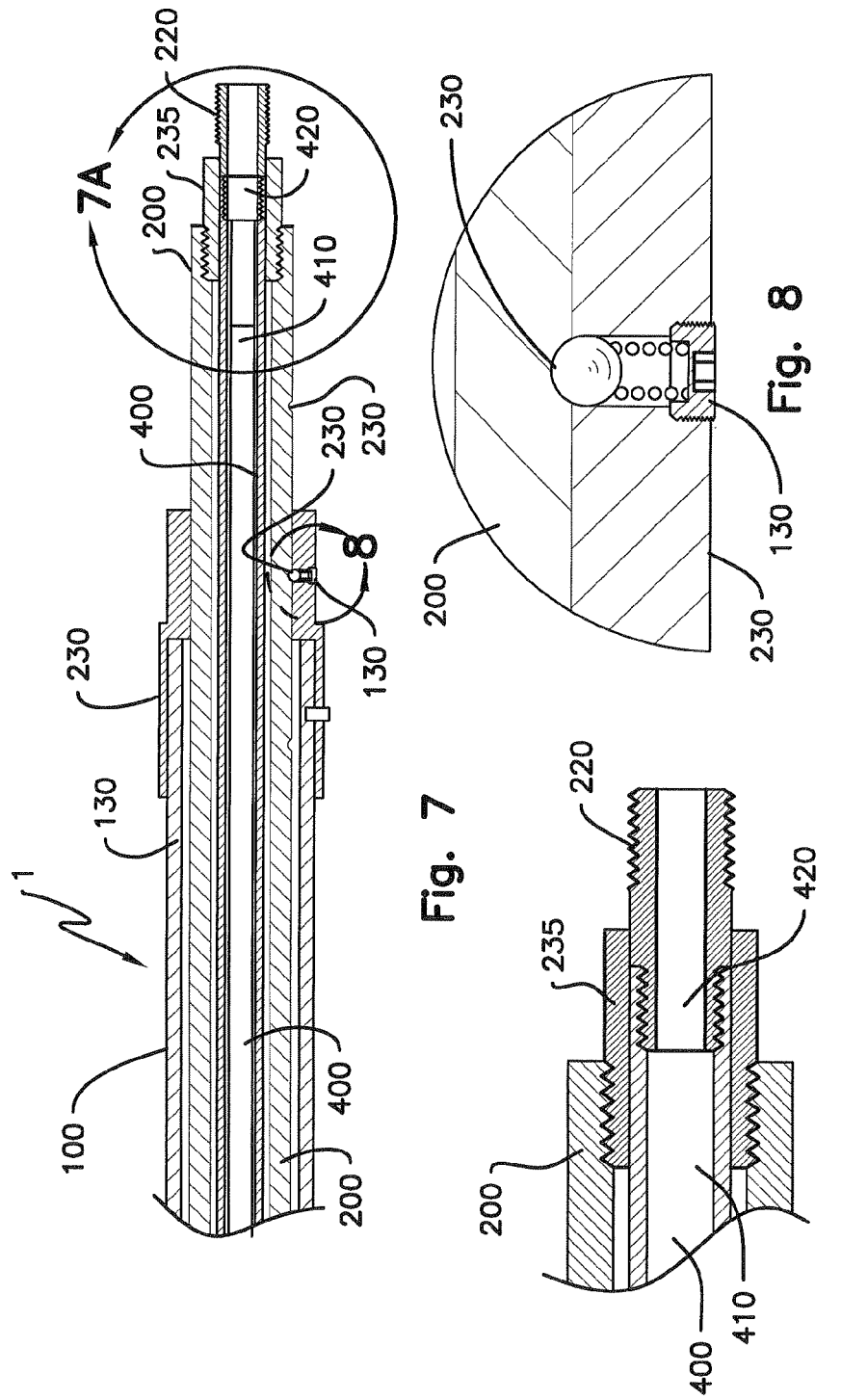

EXTENDABLE FLUID TRANSPORT APPARATUS

FIELD OF THE INVENTION

This invention relates to an extendable apparatus which conveys a fluid. The invention more specifically relates to an apparatus for extendably conveying fluids under pressure from a source to a point of discharge. The invention more specifically relates to an extendable apparatus for application of paint to a distant surface.

BACKGROUND OF THE INVENTION

Devices which convey a fluid and which are extendible are known in the prior art including U.S. Pat. No. 6,889,920 to Nance et al; U.S. Pat. No. 5,186,392 to Pleshek; U.S. Pat. No. 6,976,644 to Troudt; U.S. Pat. No. 6,811,100 to Bardinet et al; U.S. Pat. No. 5,502,864 to Sorenson; U.S. Pat. No. 4,652,024 to Krohn; U.S. Pat. No. 5,598,598 to Sorenson; U.S. Pat. No. 5,881,601 to Hammer; U.S. Pat. No. 6,378,922 to Troudt; U.S. Pat. No. 5,485,960 to Troudt; Patent Application US 2005/0045751 to Nance et al, and Patent Application No. US 2005/0029366 to Troudt. The patents referred to herein are provided herewith in an Information Disclosure Statement in accordance with 37 CFR 1.97.

SUMMARY OF THE INVENTION

The extendable fluid transport apparatus (1) comprises a tubular casing (100) having a casing slot (120) extending from the casing first end (105) or from proximal the casing first end (105) toward the casing second end. A telescoping tube (200) is received by the casing (100). At least one fixture connection means (220), for tube connection, is at the telescoping tube second end (210). Telescoping of the telescoping tube (200) fixed by interconnection means between the casing (100) and the telescoping tube (200).

A fluid tube (300) having fluid tube-casing connection means (330), for interconnection of the fluid tube (300) and the casing (100). A flex tube (400) is interconnected with the fluid tube (300) and with the telescoping tube (200).

The flex tube (400) is sized to be received and is received through the casing slot (120). Extending the telescoping (200) draws the flex tube (400) through the casing slot (120) thereby allowing communication of fluid from the fluid tube (300) to the telescoping tube (200) and the at least one fixture connection means (220) for interconnection with a fixture, such as a paint tip.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 7 illustrates the relationship between the flex tube (400) and the telescoping tube (200). Seen is the telescoping tube interconnection means (235), for interconnection of the telescoping tube (200) and the flex tube (400) at the flex tube connection means (420), at the second end (210). Also illustrated is the interconnection between the telescoping tube interconnection means (235) with fixture connection means (220) at the second end (210). Tube interconnection means may be male-female threaded means, male-female quick release or snap fittings, ferrule fittings, compression fittings and other such interconnection means.

FIG. 7A illustrates the interconnection between the telescoping tube (200), the telescoping tube interconnection means (235) and flex tube connection means (420). Also illustrated is the interconnection between fixture connection means (220) and telescoping tube interconnection means (235).

FIG. 8 shows a ball detent (130) as the casing-tube interconnection means (130) with at least one telescoping tube-casing interconnection means (230) intermediate the tube first end (205) and the tube second end (210) shown here as at least one at least one detent (230) comprising an aperture or depression at the telescoping tube (200) sized to receive and the ball of ball detent (130).

DETAILED DESCRIPTION

Figure 9:
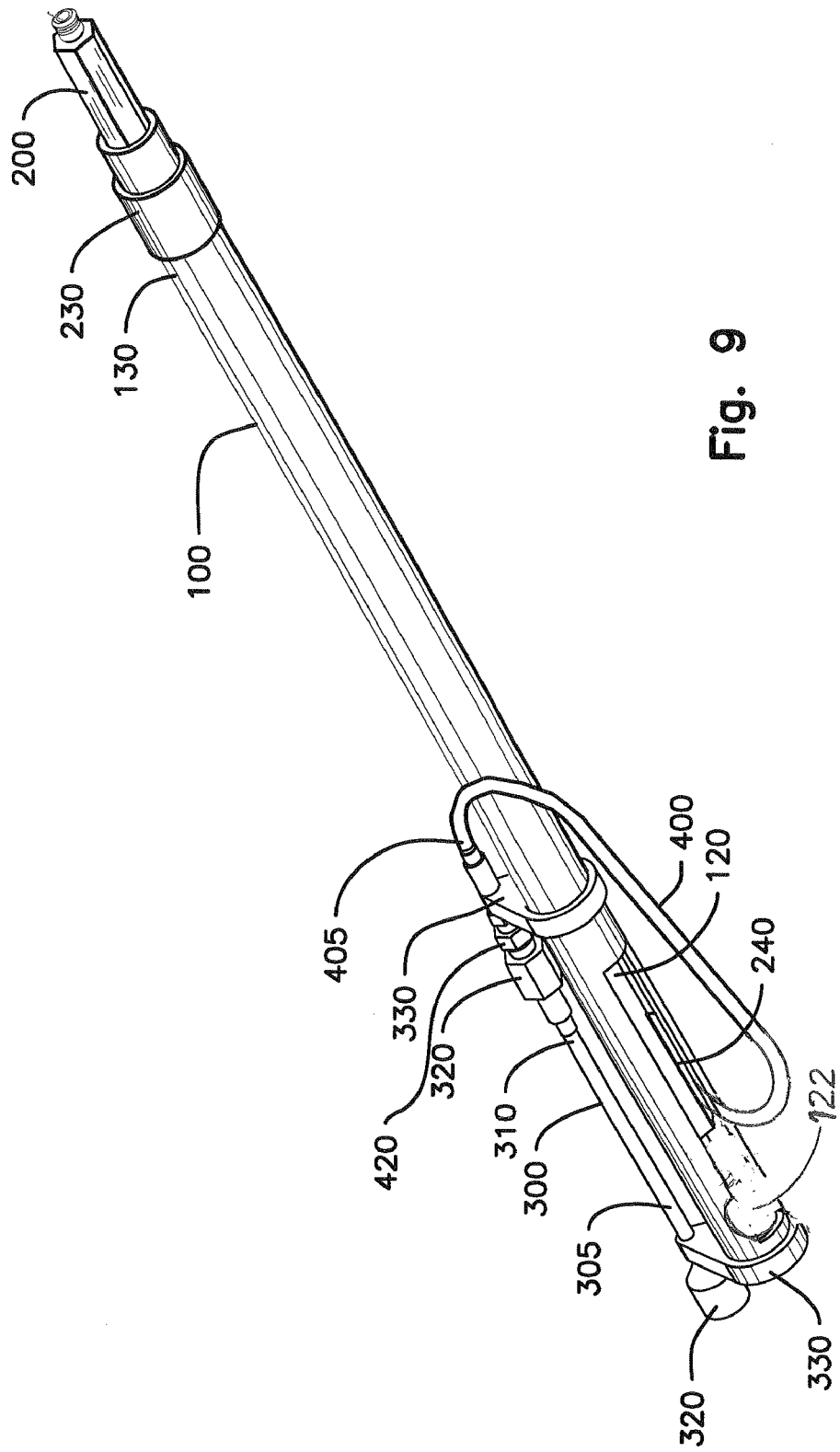
FIG. 9 shows the flex tube (400) received into the casing slot (120) and telescoping tube slot (240). Additionally seen is the casing tube slot first end (122) illustrating the casing tube slot (120) as decreasing in width distal to the casing first end (105).
Figure 10:
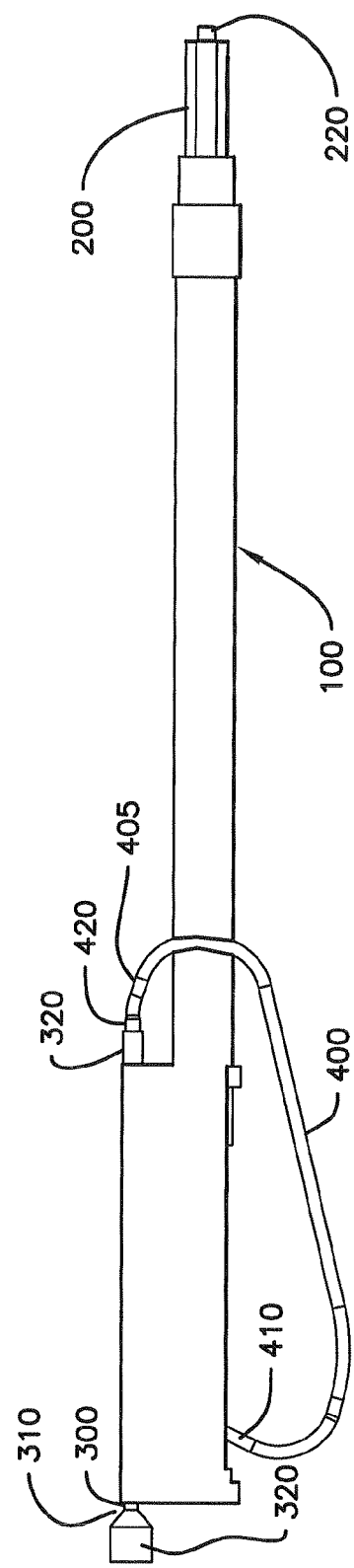
FIG. 10 illustrates the fluid tube (300) and casing (100) formed as an integral unit as with a molding process.

FIGS. 1, 2, 3, 4, 6 and 9 illustrate the extendable fluid transport apparatus (1). A tubular casing (100) has a casing first end (105), a casing second end (110), a casing axis (115) and a casing slot (120). The casing (100) is, in the preferred embodiment, formed of a rigid tubular material including metals, composite materials, plastics and fiberglass. The casing axis (115) is centrally positioned from the casing first end (105) to the casing second end (110). The casing slot (120) extends from the casing first end (105) or, in the preferred embodiment, from proximal the casing first end (105), toward the casing second end (110). The casing slot (120) is generally parallel with the casing axis (115). Seen in FIG. 9 is the casing slot first end (122) illustrating the casing slot (120) as decreasing in width as the slot progresses from proximal the casing first end (105) toward the casing second end (110). In the preferred embodiment casing-tube interconnection means (130) is immovably fixed at or proximal to the casing second end (110) or intermediate the casing first end (105) and the casing second end (110) to effect an interconnection between the casing (100) and the telescoping tube (200). In the preferred embodiment the casing-tube interconnection means (130) is a ball detent with the ball received into a tube-casing interconnection means (230) illustrated in FIGS. 7 and 8 as a detent (230), allowing the telescoping tube (200) to be extended by increments as allowed by the ball-detent function. However, those of ordinary skills in connection arts will appreciate that other structures to allow incremental extension and retracting of a telescoping tube are equivalent including, for example, a ferrule which, on rotation, will create a pressure fitting between the casing (100) and the telescoping tube (200), thereby fixing the position or extension or retraction position of the telescoping tube (200).

Seen in FIGS. 1, 2, 3, 4, 6 and 9 is a telescoping tube (200) which is sized to be received by and into the casing (100) at the casing first end (105) or the casing second end (110). In the preferred embodiment the telescoping tube is composed of a rigid tubular material including metals, composite materials, plastics and fiberglass. A person of ordinary skills in tube arts will appreciate that other materials will be equivalent. In the preferred embodiment the telescoping tube (200) has a hexagonal cross section which is received through a hexagonal shaped casing second end (110) comprising, in the preferred embodiment, an interior of the casing-tube interconnection means (130) shown in FIG. 5 as a casing-tube interconnection means hex aperture (135). A person of ordinary skills in the tubing arts will recognize that other interrelation connections will exist to fix the telescoping tube (200) from rotation relative to the casing (100). The telescoping tube (200) has a tube first end (205) and a tube second end (210) and at least one fixture connection means (220) at the tube second end (210). Fixtures may include paint tip-guards and paint tips for application of pressurized painting. As the complement to the preferred embodiment means of fixing the extension of the telescoping tube (200) and the casing-tube interconnection means (130) when formed of a ball detent, there is at least one telescoping tube-casing interconnection means (230) intermediate the tube first end (205) and the tube second end (210). In the preferred embodiment the tube-casing interconnection means (230), at the telescoping tube (200) is at least one detent (230) comprising an aperture or depression sized to immovably receive the ball of ball detent (230) until such time that the spring pressure on the ball is relieved allowing the telescoping tube (200) to be extended or retracted.

Also seen in FIGS. 1 through 4, 6 and 9 is a fluid tube (300) having a fluid tube first end (305) and a fluid tube second end (310). Fluid tube-casing connection means (330) interconnects the fluid tube (300) and the casing (100). In the preferred embodiment the fluid tube-casing connection means (330) is composed of bracket means and, in the preferred embodiment there will be at least one fluid tube-casing connection bracket (330) interconnecting the fluid tube (300) at the fluid tube first end (305) at or proximal to the casing first end (105) and at least one fluid tube-casing connection bracket (330) interconnecting the fluid tube second end (310) to the casing (100) intermediate the casing first end (105) and the casing second end (110). A person of ordinary skills in the tubing and manufacturing arts will appreciate that the fluid tube (300) and the casing (100) may be formed as an integral unit without need for bracket means.

When interconnected with the casing (100) the fluid tube (300) is positioned generally parallel with the casing axis (115). The fluid tube (300) has fluid tube connection means (320) at the fluid tube first end (305) and the fluid tube second end (310). In a preferred embodiment the fluid tube connection means (320) at the fluid tube first end (305) will interconnect with an airless paint gun, in which circumstance the fluid tube connection means (320) may present a female threaded connector.

As will be appreciated by those of ordinary skills in the tubing arts, tubing connection means, for interconnection of the several tubular structures in this invention, will include male-female threaded means, male-female quick release or snap fittings, ferrule fittings, compression fittings and other connection means known to those of ordinary skills in the tubing interconnection arts. These described connection means will be primary tube connection means, in the preferred embodiment, for interconnection between the fluid tube (300) and flex tube (400) and between the flex tube (400) and the telescoping tube (200) of the present invention. Tube connection means between the fluid tube 300, the flex tube (400) and between the flex tube (400) and the telescoping tube (200) and between the telescoping tube (200) and the fixture connection means (220) may be male-female threaded means, male-female quick release or snap fittings, ferrule fittings, compression fittings and other such interconnection means.

Seen in FIGS. 1 through 4, 5, 5A, 6, 7 and 9 is a flex tube (400) having a flex tube first end (405) and a flex tube second end (410) having flex tube connection means (420) at the flex tube first end (405) and at the flex tube second end (410). In the preferred embodiment the flex tube (400) is generally 5' in length allowing the telescoping tube (200) to be extended while maintaining fluid connectedness from the fluid tube first end (305) via the flex tube (400) to the telescoping tube second end (210).

Figure 1:
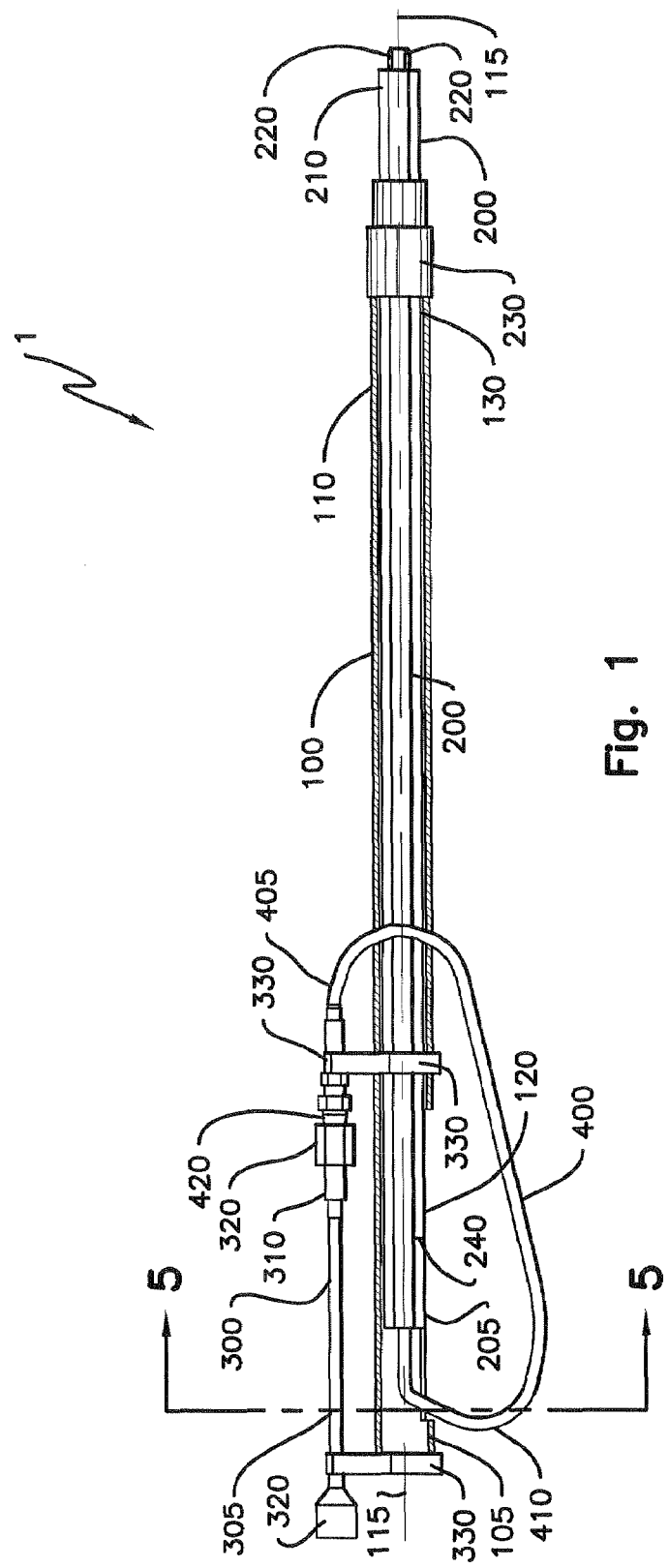
FIG. 1 is a side elevation cutaway illustrating the extendable fluid transport apparatus (1) and showing the tubular casing (100), casing slot (120), casing axis (115), casing-tube interconnection means (130) for interconnection of the casing (100) and the telescoping tube (200), the telescoping tube (200) fixture connection means (220), telescoping tube-casing interconnection means (130), the fluid tube (300), fluid tube connection means (320) for interconnection with the flex tube (400), the flex tube (400) and flex tube connection means (420) for interconnection with the fluid tube (300).
Figure 2:
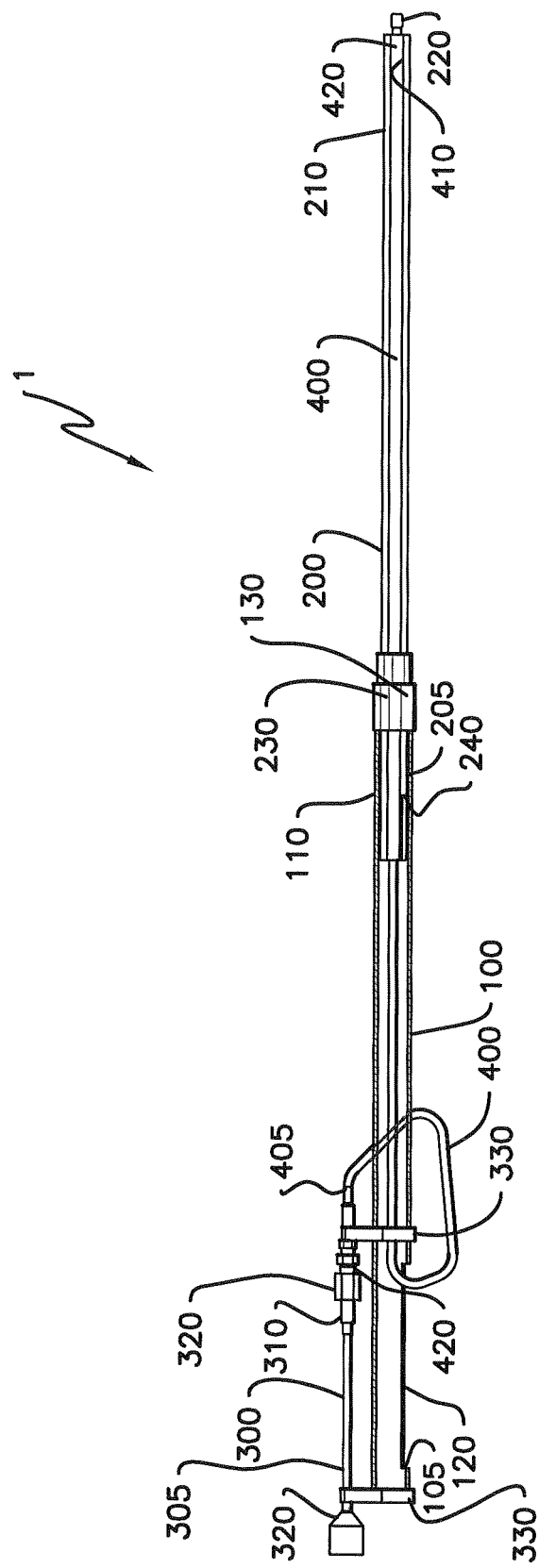
FIG. 2 is a side elevation cutaway further illustrating a casing first end (105), a casing second end (110), a casing axis (115), the casing slot (120) extending from the casing first end (105) or from proximal the casing first end (105) toward the casing second end (110), the telescoping tube (200) in an extended position showing the tube first end (205) and tube second end (210), fixture connection means (220) at the tube second end (210), telescoping tube-casing interconnection means (230), for interconnection between the telescoping tube (200) and the casing (100), intermediate the tube first end (205) and the tube second end (210), a fluid tube first end (305) and a fluid tube second end (310), fluid tube-casing connection means (330), for interconnection between the fluid tube (300) and the flex tube (400), interconnecting the fluid tube (300) and the casing (100), the flex tube first end (405) and flex tube second end (410), the telescoping tube (200) which is received by the casing (100) and telescopes from the casing (100), the telescoping tube (200) fixed in at least one telescoping position by interaction between the casing-tube interconnection means (130) and the telescoping tube-casing interconnection means (230), the fluid tube-casing connection means (330) interconnecting the tubular casing (100) and the fluid tube (300), the flex tube first end (405) is interconnected with the fluid tube second end (310), the flex tube (400) at the flex tube second end (410) received through the casing slot (120), the flex tube second end (410) flex tube connection means (420) for interconnection with the telescoping tube (200). Also seen is the telescoping tube slot (240).
Figure 3:
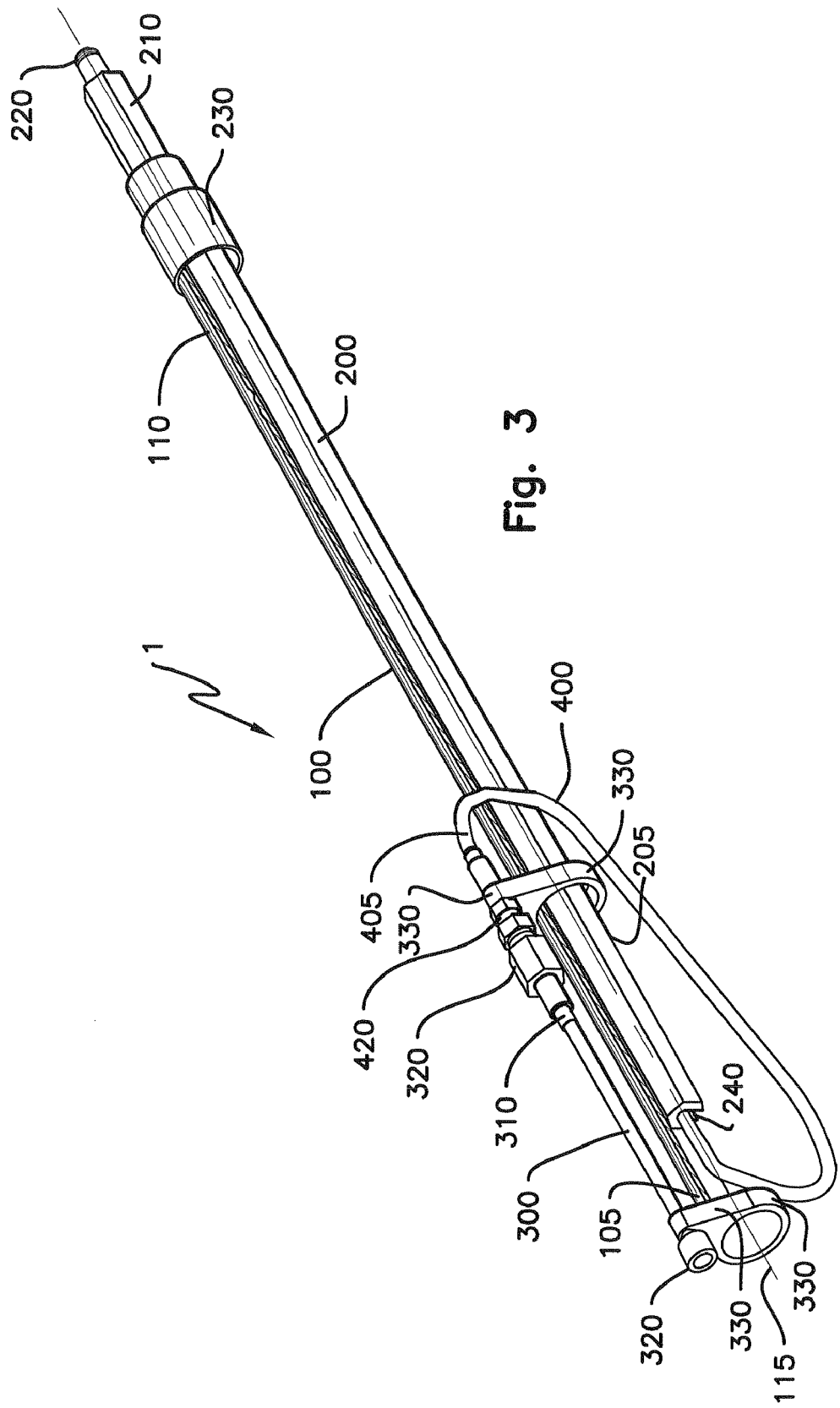
FIG. 3 is a perspective view showing the flex tube (400) received through the casing slot (120) and telescoping tube slot (240) and the offset between the fluid tube (300) and the casing slot (120).
Figure 4:
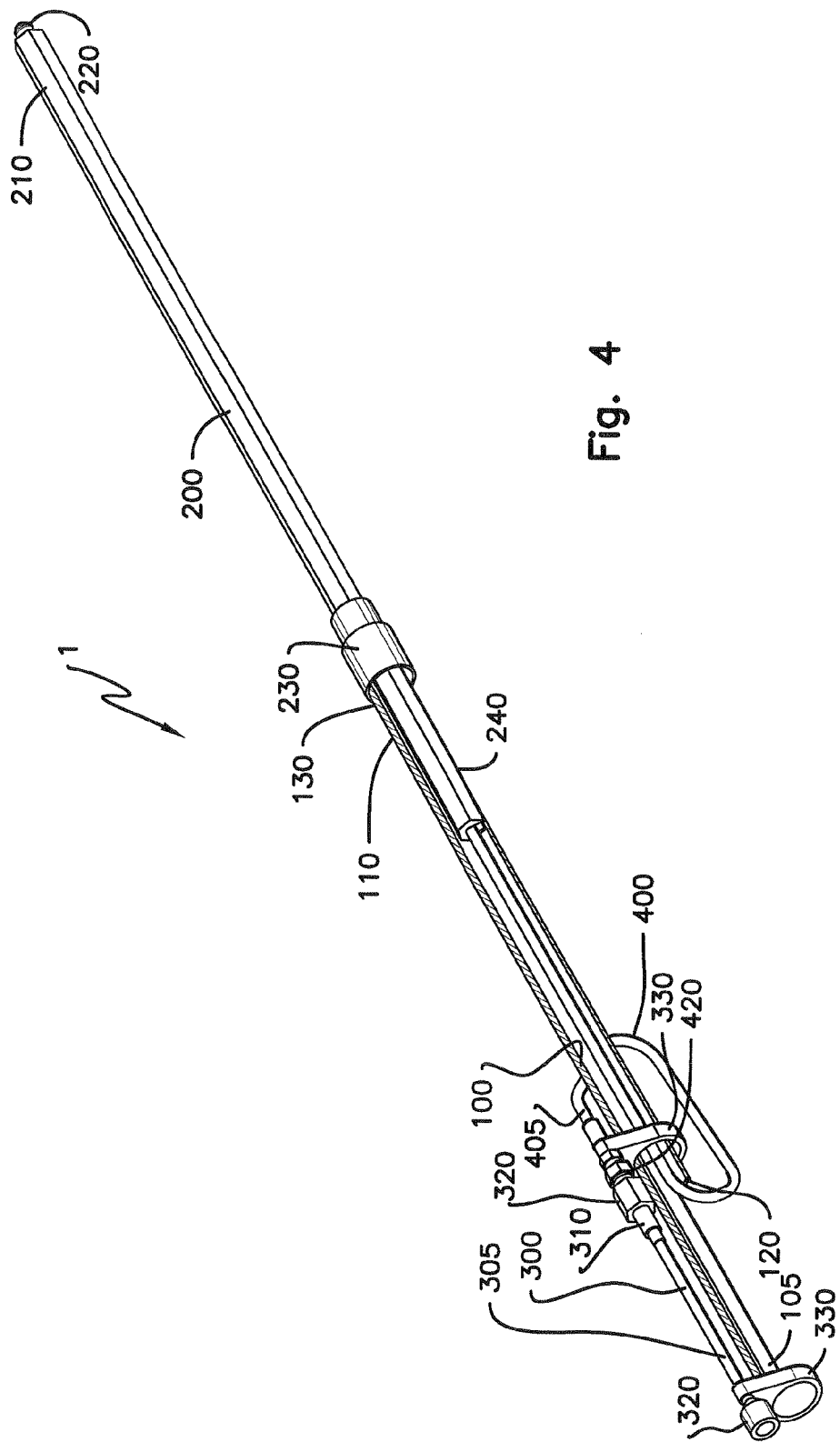
FIG. 4 is a perspective view showing the telescoping tube (200) in an extended position with the flex tube (400) drawn into the casing (100).
Figure 5:
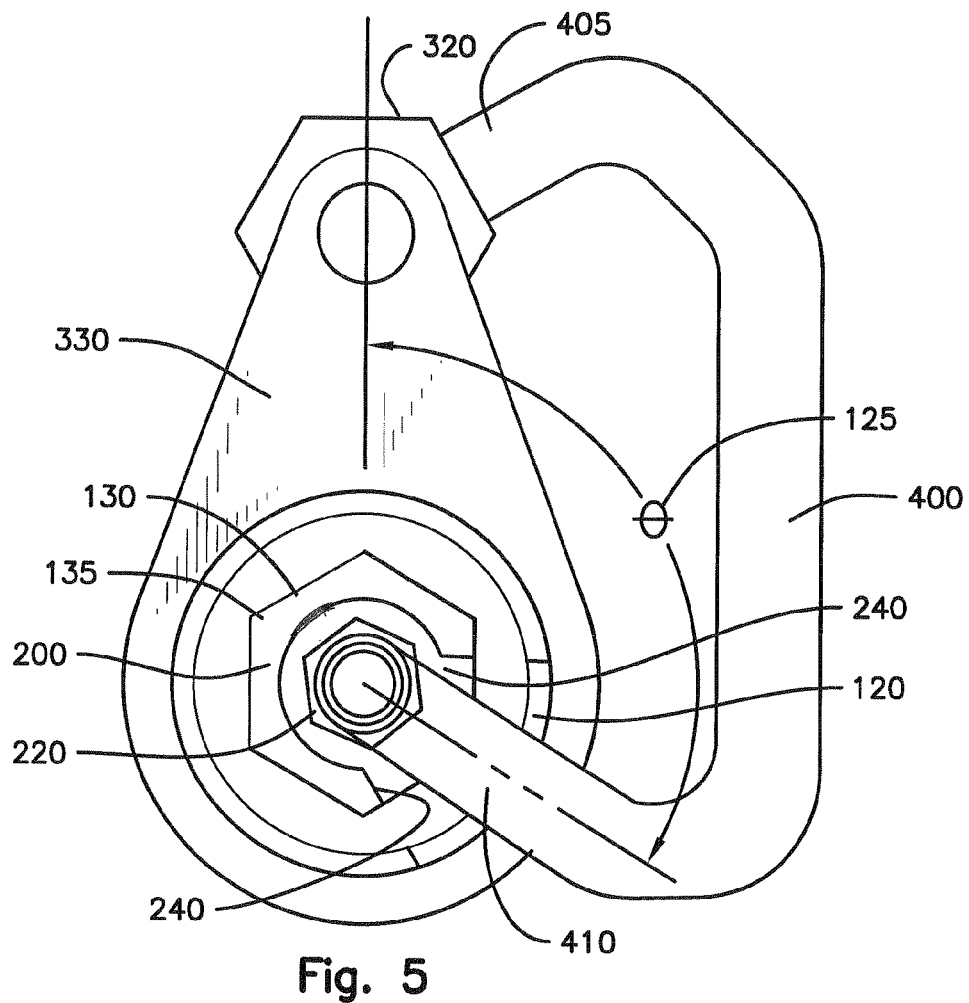
FIG. 5 is a front elevation from Section 5-5 of FIG. 1 illustrating the approximately 155° to 175° angle Θ (125) relationship between the fluid tube (300), the flex tube (400), the casing slot (120) and the telescoping tube slot (240). Also seen is the casing-tube interconnection means (130) comprised in this illustration of a casing-tube interconnection means hex aperture (135).
Figure 5A:
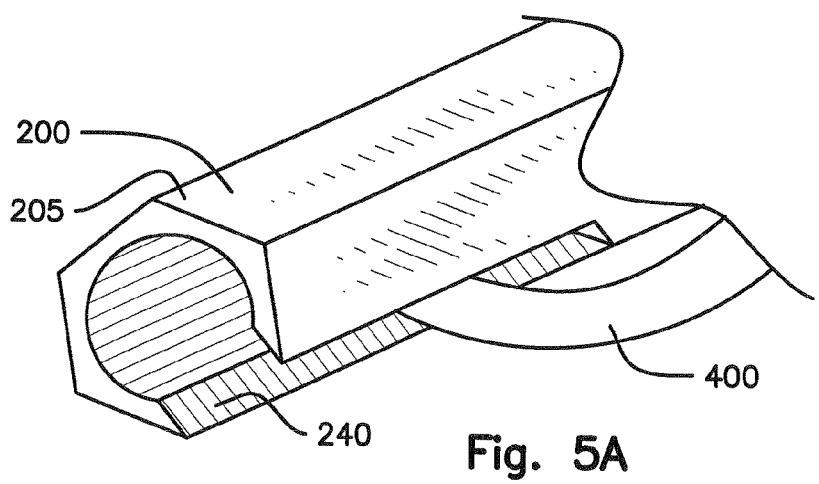
FIG. 5A is a perspective of the telescoping tube (200) showing the tube first end (205) and illustrating the telescoping tube slot (240) which extends from the first end (205) toward the second end (210) and which receives flex tube (400) into the telescoping tube (200).
Figure 6:
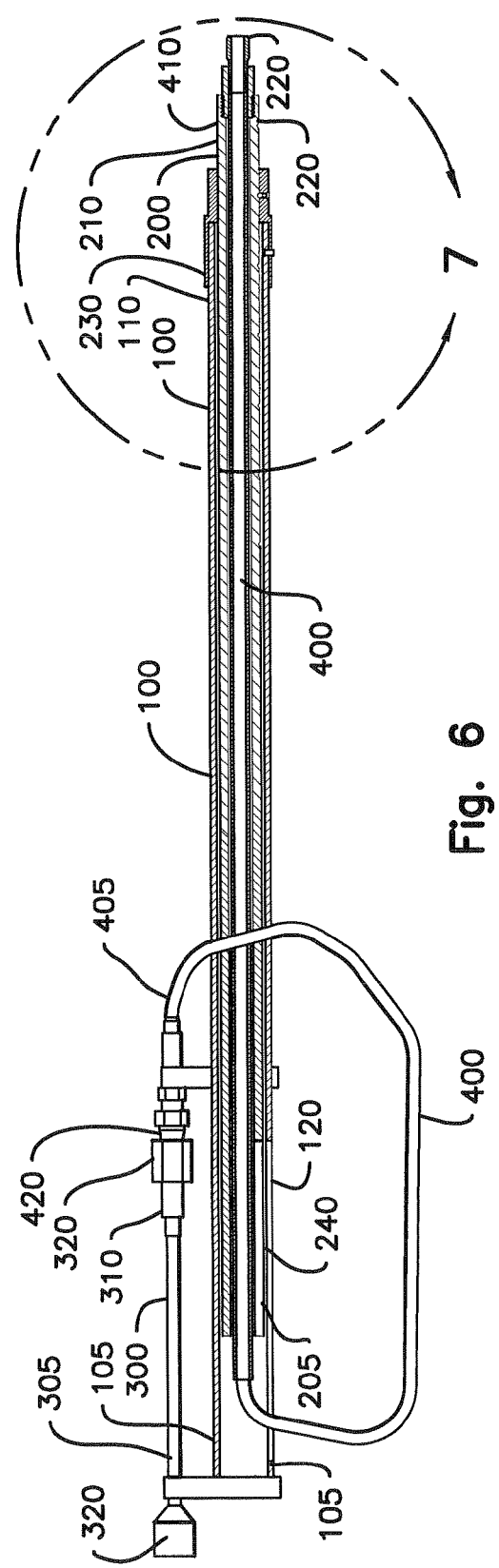
FIG. 6 shows detail 7 illustrating the interconnection between the flex tube (400) and the telescoping tube (200).

The telescoping tube (200) is received by the casing (100) at the casing first end (105) or the casing second end (110). There is at least one fixture connection means (220) at or proximal the tube second end (210). The telescoping tube (200) is fixed in at least one telescoping position by interaction between the casing-tube interconnection means (130), including a ball detent or ferrule, and the telescoping tube-casing interconnection means (230) comprised of a detent; the casing-tube interconnection means (130) being a ball detent; the tube-casing interconnection means (230) being at least one detent aperture (230) in the telescoping tube (200). In the preferred embodiment the telescoping tube (200) has a hex cross-section as seen in FIG. 5. The telescoping tube (200) from the tube first end (205) extending toward the tube second end (210) has a telescoping tube slot (240), seen in FIG. 5 and FIG. 5A, which receives the flex tube (400) into the telescoping tube (200). The casing slot (120) is aligned with the telescoping tube slot (240) to receive the flex tube (400) into the telescoping tube (200).

The fluid tube-casing connection means (330) rigidly interconnects the tubular casing (100) and the fluid tube (300). When the fluid tube-casing connection means (330) is bracket means there is at least one bracket interconnection between the fluid tube first end (305) and the casing (100) proximal the tubular casing first end (105) and at least one bracket interconnection between the fluid tube second end (310) and the casing (100) intermediate the casing first end (105) and the casing second end (110).

The flex tube (400) at the flex tube first end (405) is interconnected with the fluid tube second end (310) by connection of the flex tube first end (410) flex tube connection means (420) and the fluid tube connection means (320) at the fluid tube second end (310). The flex tube (400) at the flex tube second end (410) is sized to be received and is received through the casing slot (120) and the telescoping tube slot (240). The flex tube second end (410) flex tube connection means (420) interconnects with the telescoping tube (200) at or proximal the telescoping tube second end (215) tube connection means (220) or at the telescoping tube first end (205) or intermediate the telescoping tube first end (205) and the telescoping tube second end (210). It will be recognized by a person of ordinary skills in tubing arts that tube connection means (220) may extend from the telescoping tube second end (210) toward the telescoping tube first end (205) where interconnection may be made between the flex tube (400) and the telescoping tube (200). In the preferred embodiment the fluid tube (300) and flex tube (400) are high pressure tubing suitable for the application of fluids under pressure. Applications available includes but is not limited to the application of paint.

The fluid tube (300) is positioned, as seen in FIG. 5, relative to the casing axis (115) and relative to the casing slot (120) and the telescoping tube slot (240) at an obtuse angle Θ (125). The angle, in the preferred embodiment is generally 155° to 175°. This relationship will lessen the drag between the flex tube (400) and the casing (100) as the telescoping tube (200) is extended and retracted.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An extendable fluid transport apparatus (1) comprising:
a. a tubular casing (100) having a casing first end (105), a casing second end (110), a casing axis (115) and a casing slot (120); the casing axis (115) centrally positioned from the casing first end (105) to the casing second end (110); the casing slot (120) extending from the casing first end (105) or from proximal the casing first end (105) toward the casing second end (110) generally parallel with the casing axis (115); the casing slot (120) having a casing slot first end (122) proximal the casing first end (105); the casing slot (120) decreasing in width from proximal the casing slot first end (122) toward the casing second end (110); casing-tube interconnection means (130) at or proximal to the casing second end (110) or intermediate the casing first end (105) and the casing second end (110); a casing-tube interconnection means hex aperture (135) at or proximal the casing second end (110);
b. a telescoping tube (200) sized to be received by the casing (100) at the casing first end (105) or the casing second end (110); the telescoping tube (200) has a tube first end (205) and a tube second end (210); fixture connection means (220) at the tube second end (210); telescoping tube-casing interconnection means (230) intermediate the tube first end (205) and the tube second end (210); the telescoping tube (200) having a hexagonal cross-section; the telescoping tube (200) is received, substantially parallel with the casing axis (115), by the casing-tube interconnection means hex aperture (135) thereby securing the telescoping tube (200) from rotation;
c. a fluid tube (300) having a fluid tube first end (305) and a fluid tube second end (310); fluid tube-casing connection means (330) interconnects the fluid tube (300) and the casing (100); fluid tube connection means (320) at the fluid tube first end (305) and the fluid tube second end (310); the fluid tube (300) positioned parallel with the casing axis (115); fluid tube-casing connection means (330) comprised of at least one fluid tube bracket (330) or in the alternative the fluid tube (300) and the casing (100) formed of an integral structure;
d. a flex tube (400) having a flex tube first end (405) and a flex tube second end (410); flex tube connection means (420) at the flex tube first end (405) and at the flex tube second end (410);
e. the telescoping tube (200) is received by the casing (100) at the casing first end (105) or the casing second end (110); at least one fixture connection means (220) at or proximal the telescoping tube second end (210); the telescoping tube (200) fixed in at least one telescoping position by interaction between the casing-tube interconnection means (130) and the telescoping tube-casing interconnection means (230); the casing-tube interconnection means (130) being a ball detent; the tube-casing interconnection means (230) being at least one detent aperture or depression in the telescoping tube (200); the telescoping tube (200) having a hexagonal cross-section; a telescoping tube slot (240) extending from the telescoping first end (205) toward the telescoping second end (210) aligned with the casing slot (120) to receive the flex tube (400) into the telescoping tube (200);
f. the fluid tube-casing connection means (330) rigidly interconnects the tubular casing (100) and the fluid tube (300); when the fluid tube-casing connection means (330) is at least one fluid tube bracket there is at least one bracket interconnection between the fluid tube first end (305) and the casing (100) proximal the tubular casing first end (105) and at least one bracket interconnection between the fluid tube second end (310) and the casing (100) intermediate the casing first end (105) and the casing second end (110);

g. the flex tube (400) at the flex tube first end (405) is interconnected in fluid communication with the fluid tube second end (310) by connection of the flex tube connection means (420) and the fluid tube connection means (320); the flex tube (400) at the flex tube second end (410) is sized to be received and is received through the casing slot (120) and the telescoping tube slot (240); flex tube connection means (420) at the flex tube second end (410) is in fluid communication and interconnected with the telescoping tube (200) at the telescoping tube second end (210) via the telescoping tube interconnection means (235); the fixture connection means (220) is in fluid communication with the telescoping tube interconnection means (235) distal to the telescoping tube second end (210); the fluid tube connection means (320), the flex tube connection means (420), the telescoping tube interconnection means (235) and the fixture connection means (220) are selected from the group comprising male-female threaded means, male-female quick release fittings, snap fittings, ferrule fittings, and compression fittings.

2. An extendable fluid transport apparatus (1) comprising:
a. a tubular casing (100) having a casing slot (120);
b. a telescoping tube (200) sized to be received into the tubular casing (100) and is received into the casing (100); the telescoping tube (200) extends from and retracts into the casing (100); the telescoping tube (200) has a tube first end (205) and a tube second end (210);
c. a fluid tube (300); fluid tube-casing connection means (330) that rigidly interconnects the fluid tube (300) and the casing (100); fluid tube connection means (320) at a fluid tube first end (305) and a fluid tube second end (310);
d. a flex tube (400) having a flex tube first end (405) and a flex tube second end (410) that is flexible and has flex tube connection means (420) which is interconnected at the flex tube first end (405), for fluid transport, with the fluid tube (300) fluid tube connection means (320) at the fluid tube second end (310);
e. the telescoping tube (200) is interconnected, in fluid communication, with a telescoping tube interconnection means (235) proximal or at the telescoping tube second end (210); a fixture connection means (220) is rigidly affixed at the telescoping tube interconnection means (235) distal from the telescoping tube second end (210); the flex tube (400) extends through the casing slot (120) and into the telescoping tube (200) with tube interconnection between the flex tube connection means (420), at the flex tube second end (410), and telescoping interconnection means (235) for fluid transport and fluid conductivity from the fluid tube (300) through the flex tube (400) to the fixture connection means (220).

3. The extendable fluid transport apparatus of claim 2 further comprising:
a. the tubular casing (100) has a casing first end (105), a casing second end (110), a casing axis (115); the casing slot (120) formed in the casing (100) from or proximal to the casing first end (105) toward the casing second end (110);
b. the telescoping tube (200) is received at the casing first end (105) or the casing second end (110); the telescoping tube (200) has a tube first end (205) and a tube second end (210); the telescoping tube first end (205) is proximal the casing first end (105) when the telescoping tube (200) is retracted into the casing (100); a telescoping tube slot (240) extending from the telescoping tube first end (205) toward the telescoping tube second end (210) aligned with the casing slot (120) to receive the flex tube (400) into the telescoping tube (200);
c. the fluid tube (300) has a fluid tube first end (305) and a fluid tube second end (310); the fluid tube (300) has fluid tube connection means (320) at the fluid tube first end (305) and the fluid tube second end (310);
d. the flex tube (400) has a flex tube first end (405) and a flex tube second end (410); the flex tube (400) has flex tube connection means (420) at the flex tube first end (405) and at the flex tube second end (410);
e. the telescoping tube (200) has at least one fixture connection means (220) at or proximal the telescoping tube second end (210); said fixture connection means (220) conveys a fluid;
f. the fluid tube-casing connection means (330) rigidly interconnects the tubular casing (100) and the fluid tube (300) or the fluid tube (300) and the casing (100) are integrally formed;
g. the flex tube (400) at the flex tube first end (405) is interconnected with the fluid tube second end (310) by connection of the flex tube first end (410) flex tube connection means (420) and the fluid tube connection means (320) at the fluid tube second end (310); the flex tube (400) at the flex tube second end (410) is sized to be received and is received through the casing slot (120); the flex tube second end (410) flex tube connection means (420) interconnects with the telescoping tube (200) at the telescoping tube first end (205) tube connection means (220).

4. The extendable fluid transport apparatus of claim 3 further comprising:
a. the casing axis (115) is centrally positioned from the casing first end (105) to the casing second end (110); the casing slot (120) is generally parallel with the casing axis (115); casing-tube interconnection means (130) at or proximal to the casing second end (110) or intermediate the casing first end (105) and the casing second end (110);
b. the fluid tube (300) is positioned generally parallel with the casing axis (115); fluid tube-casing connection means (330) between the fluid tube (300) and the casing (100) is by integral construction or comprised of at least one fluid tube bracket (330) immovably fixing the fluid tube (300) to the casing (100);
c. the telescoping tube (200) is secured from rotation and secured within the casing (100) by casing-tube interconnection means (130); the telescoping tube (200) is releasably fixed in at least one extended telescoping position by interaction between the casing-tube interconnection means (130) and the telescoping tube-casing interconnection means (230).

5. The extendable fluid transport apparatus of claim 4 further comprising:
a. the casing-tube interconnection means (130) being a ball detent or ferrule; the tube-casing interconnection means (230) being at least one detent aperture (230) in the telescoping tube (200) intermediate the telescoping tube first end (205) and the telescoping tube second end (210);

b. the telescoping tube (200) has a hexagonal cross-section; the casing-tube interconnection means (130) receives the telescoping tube (200) and has a hexagonal aperture (135) to receive and secure the telescoping tube (200) from rotation;

c. when the fluid tube-casing connection means (330) is bracket means of at least one bracket interconnection between the fluid tube first end (305) and the casing (100) proximal the casing first end (105) and at least one bracket interconnection between the fluid tube second end (310) and the casing (100) intermediate the casing first end (105) and the casing second end (110).

6. The extendable fluid transport apparatus of claim 5 further comprising:

a. the fluid tube (300) is positioned relative to the casing axis (115) and relative to the casing slot (120) and telescoping tube slot (240) at a casing slot-fluid tube angle Θ (125).

7. The extendable fluid transport apparatus of claim 6 further comprising:

a. the casing slot-fluid tube angle Θ (125) is generally between 155° to 175°.

8. The extendable fluid transport apparatus of claim 7 further comprising:

a. the casing slot (120) has a casing slot first end (122) proximal the casing first end (105); the casing slot (120) width at and proximal the casing slot first end (122) is greater proximal the casing first end (105) and diminishes toward the casing second end (110).

\* \* \* \* \*